United States Patent
Wu et al.

[11] Patent Number: 6,082,414
[45] Date of Patent: Jul. 4, 2000

[54] APPARATUS AND METHOD FOR REPLACING AN ATTACHMENT ON A VACUUM CHAMBER

[75] Inventors: Wen Sheng Wu; Cheng Li Cho; Hung-Yeh Li, all of Hsin-Chu, Taiwan

[73] Assignee: Taiwan Semiconductor Manufacturing Company, Ltd, Hsin Chu, Taiwan

[21] Appl. No.: 09/205,549

[22] Filed: Dec. 3, 1998

[51] Int. Cl.⁷ .................................................. F17D 3/00
[52] U.S. Cl. .................. 141/8; 141/65; 141/98; 137/15
[58] Field of Search ................... 141/8, 65, 98; 137/14, 15; 118/715, 726

[56] References Cited

U.S. PATENT DOCUMENTS

| | | | |
|---|---|---|---|
| 3,591,827 | 7/1971 | Hall | 315/108 |
| 4,655,048 | 4/1987 | Burg | 62/78 |
| 5,405,572 | 4/1995 | DeVolk | 419/9 |
| 5,488,967 | 2/1996 | Minami et al. | 137/14 |
| 5,968,588 | 10/1999 | Sivaramakrishnan et al. | 118/715 |

*Primary Examiner*—J. Casimer Jacyna
*Attorney, Agent, or Firm*—Tung & Associates

[57] ABSTRACT

An apparatus and a method for replacing an attachment device on a vacuum chamber is disclosed. The apparatus is constructed by the major component of two shut-off valves, a rough vacuum pump, and a pressure gauge. The attachment replacement apparatus can be advantageously connected between an attachment, such as a vacuum gauge or a flow control valve and the vacuum chamber. By utilizing the present invention novel apparatus, the down time required for replacing an attachment device on the vacuum chamber can be drastically reduced by at least 90%. For instance, only a 10 minutes down time is required by utilizing the present invention novel apparatus when compared to the conventional method which requires a 10~30 hour pump-down time for resuming vacuum in a chamber that has broken vacuum. The present invention novel apparatus can be used in conjunction with any type of vacuum chambers, i.e., one utilized in a physical vapor deposition chamber, in a chemical vapor deposition chamber, in an ion implanter or in an etcher as long as a high vacuum state in the chamber is required.

11 Claims, 1 Drawing Sheet

APPARATUS AND METHOD FOR REPLACING AN ATTACHMENT ON A VACUUM CHAMBER

FIELD OF THE INVENTION

The present invention generally relates to a vacuum process chamber for electronic devices and more particularly, relates to an apparatus and a method for replacing a peripheral device mounted on a vacuum chamber without breaking vacuum in the chamber.

BACKGROUND OF THE INVENTION

In the fabrication process of semiconductor devices, numerous processing steps must be performed on a semi-conducting substrate to form various circuits. The process may consist of as many as several hundred processing steps. Each processing step is executed in a process chamber such as an etcher, a physical vapor deposition (PVD) chamber, a chemical vapor deposition (CVD) chamber or an ion implanter.

In the vast majority of the processing steps, a special environment of either a high vacuum, a low vacuum, a gas plasma or other suitable chemical environment must be provided for the process. For instance, in a PVD (or sputter) chamber, a high vacuum environment must be provided to surround the wafer such that particles sputtered from a metal target can travel to and to be deposited on an exposed surface of the wafer. In other process chambers, such as in a plasma enhanced chemical vapor deposition (PECVD) chamber, a plasma cloud of a reactant gas or gases is first formed in vacuum over a wafer such that the deposition of a chemical substance can occur on the surface of the wafer. During any processing step, the wafer must also be kept in an extremely clean environment without the danger of being contaminated. The processing of a wafer is therefore always conducted in a hermetically sealed environment that is under vacuum and is completely isolated from the atmosphere. Numerous vacuum process chambers have been provided for such purpose.

A typical vacuum process chamber 10 and its peripheral devices are shown in FIG. 1. The peripheral devices include a vacuum gauge 12 for monitoring the pressure inside the chamber 10, a high vacuum pump 14 connected to the vacuum chamber 10 through an isolation valve 16, conduit 18 and a second vacuum gauge 20 mounted to the conduit 18 through a coupling 22. The peripheral devices further include a rough pump 24 connected to the vacuum chamber 10 through conduit 26 and a shut-off valve 28. A pressure gauge 30 of the thermocouple type is mounted to the conduit 26 for monitoring the pressure. In the vacuum chamber set up of FIG. 1, when the vacuum gauge 12 which is connected to the vacuum chamber 10 through coupling 32 needs to be replaced either for maintenance or for replacement, vacuum must be broken in the vacuum chamber 10. To resume operation of the vacuum chamber after the gauge is replaced, a long pumping time is required for pumping the vacuum chamber to a high vacuum, i.e., to approximately $10^{-9}$ Torr. The long pumping time normally required is between about 10 hours and about 30 hours. Since the vacuum gauge normally needs to be serviced or replaced at an interval of approximately every six months, significant fabrication time is lost and the throughput of the fabrication process is reduced.

It is therefore an object of the present invention to provide a vacuum chamber equipped with a peripheral device mounted on the chamber that does not have the drawbacks or shortcomings of the conventional method for replacing such peripheral device.

It is another object of the present invention to provide a method for replacing a peripheral device on a vacuum chamber that does not require the breaking of vacuum in the chamber.

It is a further object of the present invention to provide a method for replacing a peripheral device on a vacuum chamber by utilizing a device replacement apparatus such that the chamber can be sealed off during the device replacement procedure.

It is another further object of the present invention to provide a method for replacing a peripheral device on a vacuum chamber without affecting the vacuum state in the chamber such that a fabrication process in the chamber can be quickly resumed.

It is still another object of the present invention to provide an apparatus for replacing an attachment on a vacuum chamber without breaking vacuum in the chamber.

It is yet another object of the present invention to provide an apparatus for replacing an attachment on a vacuum chamber without breaking vacuum such that fabrication process in the chamber can be resumed in a short period of time.

It is still another further object of the present invention to provide an apparatus for replacing an attachment on a vacuum chamber that does not break vacuum in the chamber which includes two shut-off valves, a 3-way conduit, a pressure gauge and a rough vacuum pump.

It is yet another further object of the present invention to provide an apparatus for replacing an attachment on a vacuum chamber without breaking vacuum in the chamber such that the down time required for replacing the attachment can be reduced by at least 90%.

SUMMARY OF THE INVENTION

In accordance with the present invention, an apparatus and a method for replacing an attachment on a vacuum chamber without breaking vacuum in the chamber are provided.

In a preferred embodiment, an apparatus for replacing an attachment on a vacuum chamber without breaking vacuum is provided which includes an inlet coupling adapted for connecting to an attachment at a first end and to a first opening of a first shut-off valve at a second end, a first shut-off valve which has a first opening in fluid communication with the inlet coupling and a second opening in fluid communication with a pressure gauge and a vacuum pump, a second shut-off valve which has a first opening in fluid communication with a second end of an outlet coupling and a second opening in fluid communication with the first opening of the first shut-off valve and the second end of the inlet coupling, and an outlet coupling which has a second end in fluid communication with the second shut-off valve and a first end in fluid communication with an evacuation system.

In the apparatus, the first shut-off valve may be a rough vacuum valve, while the second shut-off valve may be an isolation valve. The attachment may be a vacuum gauge. The evacuation system may be a high capacity vacuum pump. The evacuation system may be a vacuum system capable of producing a $10^{-9}$ Torr pressure.

The present invention is further directed to a method for replacing an attachment on a vacuum chamber without breaking vacuum by the operating steps of providing a replacement apparatus which has an inlet coupling adapted for connecting to an attachment at a first end and to a first opening of a first shut-off valve at a second end, a first shut-off valve which has a first opening in fluid communication with the inlet coupling and a second opening in fluid communication with a pressure gauge and a vacuum pump, a second shut-off valve which has a first opening in fluid communication with a second end of an outlet coupling and a second opening in fluid communication with the first opening of the first shut-off valve and the second end of the inlet coupling, and an outlet coupling which as a second end in fluid communication with the second shut-off valve and a first end in fluid communication with an evacuation system, then closing the second shut-off valve, disconnecting the attachment from the first end of the inlet coupling, connecting a replacement attachment to the first end of the inlet coupling, turning on the vacuum pump with the first shut-off valve in an opened position and withdrawing air from all conduits and valves in the replacement apparatus, then closing the first shut-off valve, and opening the second shut-off valve for allowing fluid communication between the evacuation system and the replacement attachment.

The method for replacing an attachment on a vacuum chamber without breaking vacuum may further include the step of evacuating by the evacuation system to a pressure of not higher than $10^{-7}$ Torr. The attachment may be a peripheral device for a vacuum chamber such as a vacuum gauge or a flow control valve. The method may further include the step of turning on the vacuum pump and withdrawing air from all conduits and valves in the replacement apparatus to a pressure of not higher than $10^{-3}$ Torr. The vacuum pump may a rotary pump. The pressure gauge may be of the thermocouple type.

The present invention is further directed to a vacuum system for processing electronic devices which includes a vacuum chamber for holding an electronic device therein, an evacuation system in fluid communication with the vacuum chamber, an attachment replacement apparatus which includes an inlet coupling adapted for connecting to an attachment at a first end and to a first opening of a first shut-off valve at a second end, a first shut-off valve which has a first opening in fluid communication with the inlet coupling and a second opening in fluid communication with a pressure gauge and a vacuum pump, a second shut-off valve which has a first opening in fluid communication with a second end of an outlet coupling and a second opening in fluid communication with the first opening of the first shut-off valve and the second end of the inlet coupling, and an outlet coupling which has a second end in fluid communication with the second shut-off valve and a first end in fluid communication with the vacuum chamber, and an attachment in fluid communication with a first end of the inlet coupling of the attachment replacement apparatus.

In the vacuum system for processing electronic devices, the attachment may be a vacuum gauge or a flow control device. The attachment may be any other peripheral device for the vacuum chamber. The evacuation system may be a vacuum pump for producing a pressure not higher than $10^{-7}$ Torr. The vacuum pump withdraws air from the attachment replacement apparatus to a pressure of not higher than $10^{-3}$ Torr. The vacuum pump may be a rotary pump. The pressure gauge may be of the thermocouple type.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses an apparatus and a method for replacing an attachment on a vacuum chamber without having to break vacuum in the chamber. The present invention novel apparatus and method enables the replacement of a vacuum gauge or a flow control device that is in fluid communication with the vacuum chamber in a much shorter time period, i.e., less than 10% of that normally required for replacing such attachment on a vacuum chamber.

The present invention novel apparatus is also directed to an attachment replacement apparatus which includes the following major components: two shut-off valves, a 3-way conduit, a pressure gauge and a rough vacuum pump. The present invention attachment replacement apparatus can be advantageously connected between an attachment, such as a vacuum gauge or a flow control device, and a vacuum chamber by using two couplings, i.e., an inlet coupling and an outlet coupling. The present invention novel apparatus allows the complete isolation, or shut-off of the interior of a vacuum chamber such that a high vacuum in the chamber can be maintained while the attachment is removed from the chamber. The novel apparatus allows at least a 90% reduction in the time required for such replacement, for instance, from between 10 and 30 hours down to about 10 minutes. The present invention novel apparatus further prevents chamber contamination due to gauge replacement or wafer contamination. The novel apparatus can be utilized in conjunction with any type of vacuum chambers such as that used in a sputter, in a CVD, in an etcher or in an ion implanter. With the present invention vacuum gauge replacement apparatus installed between a vacuum chamber and a vacuum gauge, the vacuum gauge can be easily replaced without breaking the high vacuum in the chamber.

Figure 1:
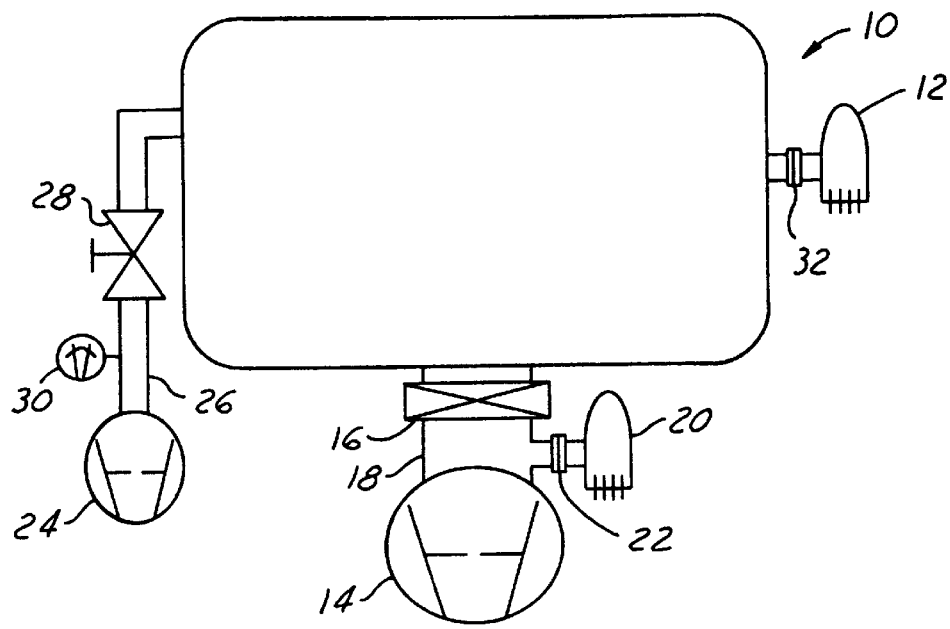
FIG. 1 is a graph illustrating a conventional vacuum chamber system equipped with a vacuum gauge, a high capacity vacuum pump and a rough pump.
Figure 2:
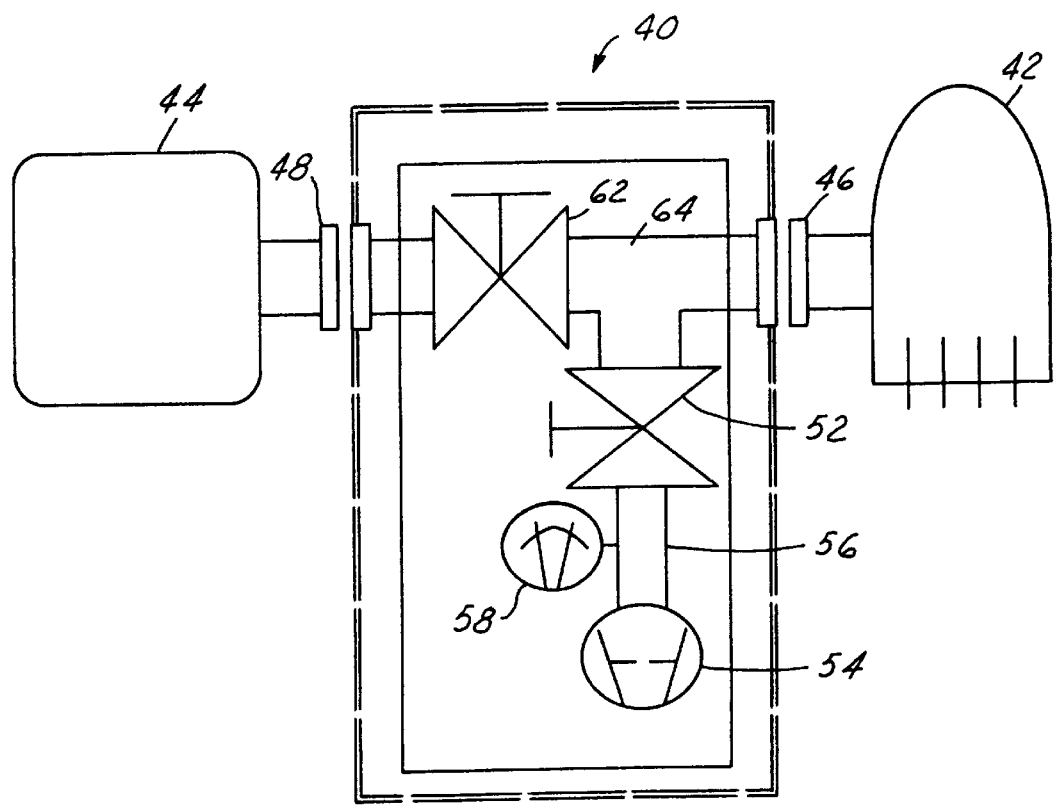
FIG. 2 is a graph illustrating the present invention attachment replacement apparatus for use between a vacuum gauge and a vacuum system.

Referring now to FIG. 2, wherein a present invention attachment replacement apparatus 40 is shown in the black formed by the dashed lines. As shown in FIG. 2, the present invention attachment replacement apparatus 40 is installed inbetween a vacuum gauge 42 and a vacuum system 44 through a first coupling 46 and a second coupling 48. The attachment replacement apparatus 40 consists of a first shut-off valve 52, a rough pump 54, a conduit 56, a pressure gauge 58 of the thermocouple type, and a second shut-off valve 62 which is also an isolation valve. The first shut-off valve 52, the second shut-off valve 62 and the first coupling 46 are connected together in fluid communication by a 3-way conduit 64. The first shut-off valve 52 is also known as a rough valve in the industry. The attachment replacement apparatus 40 can be packaged in a self-contained compact unit and be attached to a vacuum system through the second coupling 48 before a vacuum gauge is mounted to the first coupling 46.

The operation of the present invention novel attachment replacement apparatus 40 can be carried out in the following manner. First, when the vacuum gauge 42 must be replaced for either maintenance or because of a faulty status, the second shut-off valve 62 (or the isolation valve) is turned off such that the high vacuum state in the vacuum system 44 can be maintained and not be disturbed. The vacuum gauge 42, or any other attachment for the vacuum chamber, may then be disconnected from the first coupling 46 and removed. A new vacuum gauge, or any other attachment device may then be installed and connected to the first coupling 46. It should be noted that, the interior cavity of the 3-way conduit 64 has been opened to the atmosphere and therefore no longer under vacuum. The rough vacuum pump 54, which may be a rotary type pump, is then turned on to evacuate the cavity in the 3-way valve 64 by opening the first shut-off valve 52 or the rough valve. The pressure gauge 58 is used to monitor the vacuum achieved by the rough pump 54 in the conduit 56. After a satisfactory vacuum, i.e., of at least $10^{-3}$ Torr, has been achieved, the first shut-off valve 52 is closed before the rough pump 54 is turned off. At this time, the cavity in the 3-way valve 64 has achieved a vacuum status and therefore, the second shut-off valve 62, or the isolation valve can now be opened such that a fluid communication between the vacuum gauge 42 can be achieved through couplings 46, 48, conduit 64 and the second shut-off valve 62. The vacuum gauge, or any other attachment device, can now be used to monitor the vacuum condition in the vacuum system 44. The time required for performing the above described process is approximately 10 minutes.

In the present invention method, the small cavity in the 3-way conduit 64 can be rapidly pumped down to a desired vacuum state by the rough pump 54. The time required for pumping down the small cavity in the conduit 64 is significantly shorter than that required to pump down the entire vacuum system 44 when vacuum is broken in the chamber. For instance, the time required for pumping down the entire vacuum system, i.e., the vacuum chamber may be as long as 30 hours. The present invention novel apparatus of the attachment replacement apparatus and the associated method can therefore be used to reduce at least 90% of the down time required conventionally for replacing a vacuum gauge, or any other attachment device on a vacuum chamber that is in fluid communication with the chamber.

The present invention novel method and apparatus of an attachment replacement apparatus have therefore been amply demonstrated in the above descriptions and in the appended drawing of FIG. 2.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A method for replacing an attachment on a vacuum chamber without breaking vacuum comprising the steps of:
    providing a replacement apparatus having an inlet coupling adapted for connecting to an attachment at a first end and to a first opening of a first shut-off vale at a second end, a first shut-off valve having a first opening in fluid communication with said inlet coupling and a second opening in fluid communication with a pressure gauge and a vacuum pump, a second shut-off valve having a first opening in fluid communication with a second end of an outlet coupling and a second opening in fluid communication with said first opening of said first shut-off valve and said second end of said inlet coupling, and an outlet coupling having a second end in fluid communication with said second shut-off valve and a first end in fluid communication with an evacuation system, closing said second shut-off valve, disconnecting said attachment from said first end of said inlet coupling, connecting a replacement attachment to said first end of said inlet coupling, turning on said vacuum pump with said first shut-off valve in an open position and withdrawing air from all conduits and valves in said replacement apparatus, closing said first shut-off valve, and opening said second shut-off valve for allowing fluid communication between said evacuation system and said replacement attachment.

2. A method for replacing an attachment on a vacuum chamber without breaking vacuum according to claim 1, wherein said first shut-off valve is a rough vacuum valve.

3. A method for replacing an attachment on a vacuum chamber without breaking vacuum according to claim 1, wherein said second shut-off valve is an isolation valve.

4. A method for replacing an attachment on a vacuum chamber without breaking vacuum according to claim 1, wherein said attachment is a vacuum gauge.

5. A method for replacing an attachment on a vacuum chamber without breaking vacuum according to claim 1, wherein said vacuum pump is a vacuum system capable of producing $10^{-9}$ Torr pressure.

6. A method for replacing an attachment on a vacuum chamber without breaking vacuum according to claim 1 further comprising the step of evacuating by said evacuation system to a pressure of not higher than $10^{-7}$ Torr.

7. A method for replacing an attachment on a vacuum chamber without breaking vacuum according to claim 1, wherein said attachment is a peripheral device for a vacuum chamber.

8. A method for replacing an attachment on a vacuum chamber without breaking vacuum according to claim 1, wherein said attachment is a flow control valve.

9. A method for replacing an attachment on a vacuum chamber without breaking vacuum according to claim 1 further comprising the step of turning on said vacuum pump and withdrawing air from all conduits and valves in said replacement apparatus to a pressure of not higher than $10^{-3}$ Torr.

10. A method for replacing an attachment on a vacuum chamber without breaking vacuum according to claim 1, wherein said vacuum pump is a rotary pump.

11. A method for replacing an attachment on a vacuum chamber without breaking vacuum according to claim 1, wherein said pressure gauge is of the thermocouple type.

* * * * *